United States Patent [19]

Yoneda et al.

[11] Patent Number: 4,942,489
[45] Date of Patent: Jul. 17, 1990

[54] THIN-FILM MAGNETIC HEAD

[75] Inventors: Ko Yoneda, Kawasaki; Yasushi Toda; Tooru Matsuda, both of Yokohama; Kenji Makino; Kenji Nagata, both of Kawasaki, all of Japan

[73] Assignee: Canon Kabushiki Kaisha, Tokyo, Japan

[21] Appl. No.: 140,786

[22] Filed: Jan. 5, 1988

Related U.S. Application Data

[60] Division of Ser. No. 37,070, Apr. 13, 1987, which is a continuation of Ser. No. 641,738, Aug. 17, 1984, abandoned.

[30] Foreign Application Priority Data

Aug. 24, 1983 [JP] Japan ............................. 58-153171
Nov. 10, 1983 [JP] Japan ............................. 58-209827
Dec. 22, 1983 [JP] Japan ............................. 58-240950

[51] Int. Cl.$^5$ ............................................. G11B 5/28
[52] U.S. Cl. ................................. 360/121; 360/125
[58] Field of Search ............... 360/121, 123, 125–126, 360/119

[56] References Cited

U.S. PATENT DOCUMENTS

| | | | |
|---|---|---|---|
| 3,889,295 | 6/1975 | Billawala | 360/123 |
| 4,044,394 | 8/1977 | Hanazono et al. | 360/123 |
| 4,150,408 | 4/1979 | Koel et al. | 360/119 X |
| 4,165,525 | 8/1979 | Koel et al. | 360/125 |
| 4,255,772 | 3/1981 | Perez et al. | 360/113 |
| 4,317,149 | 2/1982 | Elser et al. | 360/126 |
| 4,416,056 | 11/1983 | Takahashi | 360/123 X |
| 4,504,880 | 3/1985 | Church et al. | 360/113 |

FOREIGN PATENT DOCUMENTS

| | | | |
|---|---|---|---|
| 56-83823 | 7/1981 | Japan | 360/125 |
| 1040517 | 9/1983 | U.S.S.R. | 360/125 |

Primary Examiner—John H. Wolff
Attorney, Agent, or Firm—Fitzpatrick, Cella, Harper & Scinto

[57] ABSTRACT

A thin-film magnetic head which can simultaneously trace two tracks is disclosed. This head comprises: a pair of magnetic gap portions; and a pair of magnetic thin-film layers each of which includes a magnetic pole portion in contact with the magnetic gap portion. A distance between these layers increases as they go away from the magnetic pole portions. Each of the layers includes an expanded portion having a cross sectional area in the passing direction of the magnetic fluxes which is larger than a cross sectional area in the passing direction of the magnetic fluxes at the magnetic pole portion.

4 Claims, 3 Drawing Sheets

THIN-FILM MAGNETIC HEAD

This is a division of application Ser. No. 037,070, filed Apr. 13, 1984, which is a continuation of Ser. No. 641,738, filed Aug. 17, 1984, now abandoned.

BACKGROUND OF THE INVENTION

1. Field of the Invention

The present invention relates to a thin-film magnetic head and, more particularly, to thin-film magnetic heads which can simultaneously trace two tracks.

2. Description of the Prior Art

Recently, as an apparatus for recording and reproducing a still picture, a magnetic recording and reproducing apparatus using a magnetic disk has been proposed.

In such an apparatus, a still video signal of one field is generally recorded in one circular track which circles the magnetic disk. However, in the case where the diameter of magnetic disk is small as the apparatus becomes small-sized or the like, such a signal cannot be recorded in one circular track to ensure a sufficient recording density, so that it is necessary to record the still video signal of one field in two tracks.

In this case, it is obviously desirable to use magnetic heads which can simultaneously record and reproduce the signal.

On the other hand, in case of recording a still video signal of two fields, i.e., one frame, even in the case where the video signal of one field is recorded in one circular track and the still picture is recorded and reproduced by use of two circular tracks, it is desirable that the magnetic heads can simultaneously trace two tracks.

However, when such magnetic heads which can simultaneously trace two tracks are constructed as conventional bulk types having, ring-like magnetic cores, there is a large amount of crosstalk between two tracks since a pair of bulk type magnetic cores are extremely closely arranged, so that this causes a practical problem.

Therefore, use is made of thin-film magnetic heads which can be constituted as extremely small-sized heads as compared with the bulk type magnetic heads.

Thin-film magnetic heads have many advantages such that: they can be formed by various kinds of thin-film depositing methods similar to the semiconductor manufacturing process; working accuracy is remarkably good; a plurality of heads can be extremely easily formed on the same substrate; mass production is possible; and uniform products can be derived.

Therefore, thin-film magnetic heads are widely used in information equipment including an external storage device of an electronic computer, video tape recorders, magnetic recording camera, etc. as the magnetic recording is performed at a high density.

FIG. 1 shows a conventional structure of conventional thin-film magnetic heads.

FIG. 1 illustrates an example of heads which can simultaneously trace two tracks and the conductors of which are spirally formed such that they are turned three times.

In FIG. 1, a numeral 1 denotes a magnetic substrate and conductors 6 are formed on the magnetic substrate 1 such that they are turned three times. Recording currents are supplied to the conductors 6 from electrodes 7 also formed on the magnetic substrate 1.

On the other hand, a numeral 4 represents upper magnetic layers which consist of magnetic thin films and form the other magnetic yokes as parts of magnetic circuits of the magnetic heads. Respective ends of the upper magnetic layers 4 are fixed to the sides of contact holes 2 formed at central portions of the spiral conductors 6, thereby providing the magnetic junctions with the magnetic substrate 1. The other ends are fixed in the manner such that they face the side of edge portions of the magnetic substrate 1, thereby forming magnetic gaps 5 between the edge portions of the upper magnetic layers 4 and the edge portions of the magnetic substrate 1.

The respective layers which are formed on and over the magnetic substrate 1 shown in FIG. 1 are formed by the thin-film depositing method and photolithography, respectively.

In FIG. 1, the insulation layers between the respective layers are omitted.

For magnetic recording by use of such thin-film magnetic heads, magnetic fields are generated on the sides of magnetic gaps 5 by allowing recording current to flow through the conductors 6 from the electrodes 7, thereby magnetizing a magnetic recording medium (not shown) which is located near the gap portions. Thus, the magnetic recording is performed.

On the other hand, for reproducing the signals magnetically recorded, the magnetic fluxes generated form the recorded and magnetized portions on the magnetic recording medium which are located near the magnetic gaps 5 pass through the magnetic substrate 1 and upper magnetic layers 4 and cross the conductors 6. These magnetic fluxes are changed as the magnetic recording medium is moved, causing voltages to be induced between the conductors 6 and the electrodes 7. Therefore, reproduction is performed by detecting these voltages.

The crosstalk between the tracks occurs due to two reasons: the coils of the two tracks have direct magnetic coupling; and the magnetic flux leaps between the magnetic yokes of the two tracks.

The crosstalk due to the leap of the magnetic flux between the magnetic yoke increases as the facing areas of magnetic yokes increase.

On the other hand, in the thin-film magnetic heads, thicknesses of magnetic yokes are small and those facing areas can be made remarkably smaller than those of bulk heads; therefore, a decrease in crosstalk can be expected.

However, when the thicknesses of upper magnetic layers 4 as the magnetic yokes and of the magnetic substrate 1 are reduced, the magnetic resistances of the magnetic yoke portions are enlarged, causing a drawback such as deterioration in efficiencies upon recording and reproduction.

To overcome such a drawback, for example, it is necessary to set the widths in the directions of tracks of upper magnetic layers 4 to be large. However, when such a structure is adopted, the portion where the magnetic yokes of both tracks approach becomes long, so that crosstalk easily occurs and cannot be reduced below, e.g., −40 dB.

Namely, since the extraction electrodes extracted from the two heads are alternately formed on the substrate in the same repetitive pattern, the extraction electrodes of the two heads are not symmetric with respect to the right and left sides and the mutual distributed capacitances are not equal. Thus, there is the drawback that the electromagnetic conversion characteristics of the two heads are not balanced.

SUMMARY OF THE INVENTION

It is an object of the present invention to eliminate the drawbacks of the conventional thin-film magnetic heads as mentioned above.

Another object of the invention is to provide thin-film magnetic heads which can reduce the crosstalk between the tracks.

Still another object of the invention is to provide thin-film magnetic heads in which the electromagnetic conversion characteristics of two heads are balanced.

Still another object of the invention is to provide thin-film magnetic heads which are resistant to influence by external noise.

To achieve such objects, according to the present invention, there is given, as one embodiment thereof, a thin-film magnetic head capable of simultaneously tracing two tracks, comprising a pair of magnetic gap portions; and a pair of magnetic thin-film layers each of which includes a magnetic pole portion in contact with said magnetic gap portion, each of said layers including an expanded portion having a cross sectional area in the passing direction of the magnetic fluxes which is larger than a cross sectional area in the passing direction of the magnetic fluxes at said magnetic pole portion, and a distance between said magnetic thin-film layers increasing as they go away from said magnetic pole portions.

The above and other objects, features and advantages of the present invention will be apparent from the following detailed description in conjunction with the accompanying drawings.

DETAILED DESCRIPTION OF THE PREFERRED EMBODIMENTS

Figure 1:
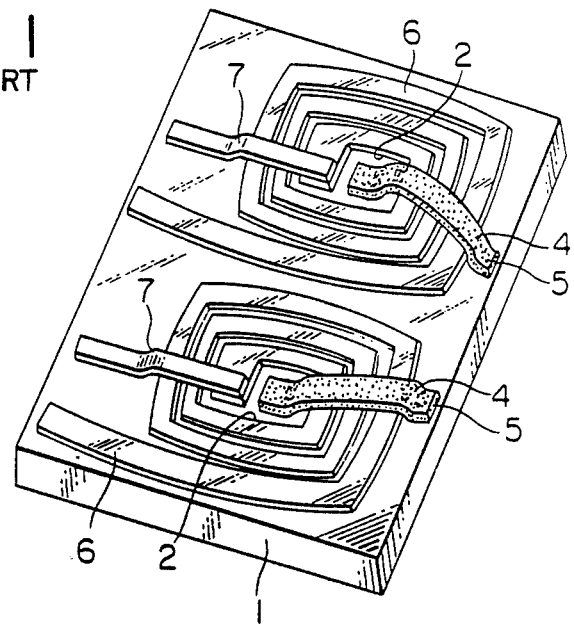
FIG. 1 is a perspective view showing the structure of conventional thin-film magnetic heads.
Figure 2:
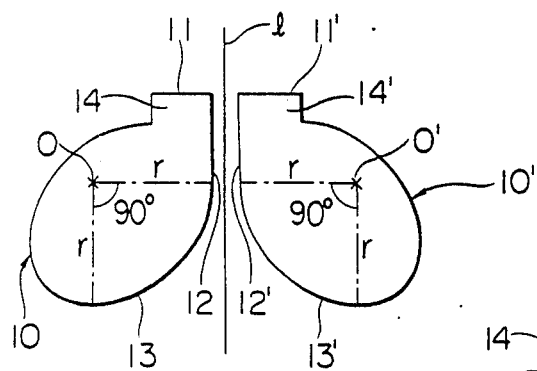
FIG. 2 is a plan view showing the shapes of magnetic thin films of thin-film magnetic heads according to one embodiment of the present invention.

FIG. 2 is a diagram for explaining an embodiment of the present invention, in which magnetic yokes 10 and 10' correspond to the upper magnetic layers 4 shown in FIG. 1. These magnetic layers 10 and 10' have the symmetrical shapes with respect to the right and left sides as will be obvious from FIG. 2.

Assuming that the axis of symmetry is 1, rectilinear portions 12 and 12' are formed at the side edges on the side of the axis 1 of symmetry of the respective magnetic yokes 10 and 10' by predetermined distances from the sides of magnetic gaps 11 and 11'. Further, arc-like portions 13 and 13' are continuously formed from the final end portions of the rectilinear portions 12 and 12'.

The arc-like portions 13 and 13' form parts of circles having centers O and O' and radii of r in the respective magnetic yokes 10 and 10'. The areas surrounded by the arc-like portions 13 and 13' are approximately one-fourth of the area of the circle with the radius of r.

Therefore, the arc-like portions 13 and 13' are formed in the direction such as to go away from the axis 1 of symmetry.

In addition, the arc-like portions 13 and 13', as a whole, form parts of the magnetic yokes 10 and 10' which swell in the direction such as to go away from the axis 1 of symmetry.

Then, magnetic pole portions 14 and 14' having predetermined widths are formed on the sides of the magnetic gaps 11 and 11' of the respective magnetic yokes 10 and 10'.

With such a structure, as the magnetic yokes 10 and 10' go away from the sides of the magnetic gaps 11 and 11', respectively, the distance between them increases, thereby preventing the occurrence of the crosstalk due to approach of the magnetic yokes.

In the case of magnetic yokes 10 and 10' being the magnetic circuits of the magnetic heads, the magnetic cross sectional areas are enough for the magnetic fluxes to pass therethrough, thereby allowing magnetic efficiency to be remarkably improved.

Namely, the arc-like expanded portions of the magnetic yokes 10 and 10' coincide with the directions of magnetic fluxes flowing through the magnetic yokes 10 and 10'. Therefore, it is possible to constitute the magnetic heads with good efficiencies in which there is no vain portions as the magnetic circuits.

In addition, since the magnetic yokes are arranged such that the distance therebetween increases as they are apart from the sides of the magnetic gaps, the magnetic fluxes which leap to the side of the adjacent magnetic yokes become less, so that the crosstalk extremely decreases.

Although there have been shown, as an example, the magnetic yokes 10 and 10' with the structure whereby the shapes thereof have the expanded portions which, as a whole, have arc-like portions and go away from one another, the peripheral edges of the yokes are not always arc-like shaped. For example, they may be a polygonal shaped.

On the other hand, in the foregoing embodiment, there has been shown an example whereby the invention was applied to the sides of the upper magnetic layers constituting one of the magnetic yokes of the magnetic heads. However, the invention may be applied to any one of the sides of two magnetic yokes which exist so as to sandwich the magnetic gaps.

Also, in the case of forming both magnetic yokes with magnetic films, both magnetic yokes can be formed like the shapes shown in FIG. 2. With such a structure, a further large effect is derived.

Figure 3:
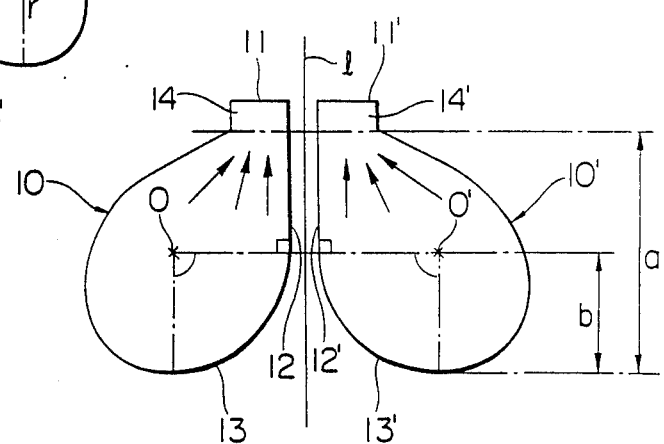
FIG. 3 is a plan view showing the shapes of magnetic thin films of thin-film magnetic heads according to another embodiment of the invention.

FIG. 3 is a diagram for explaining another embodiment of the present invention, in which the same and corresponding parts and elements as those shown in FIG. 2 are designated by the same reference numerals and their descriptions are omitted.

In this embodiment, the locations of the centers O and O' of the circles forming the arc-like portions 13 and 13' are limited.

Practically speaking, when it is assumed that the distances from the base portions of the magnetic pole portions 14 and 14' to the edge portions of the respective magnetic yokes 10 and 10' are a and the distances from the centers O and O' to the edge portions of the magnetic yokes 10 and 10' are b, they are set such that the ratio a/b lies within a range of $1.75 < a/b < 2.25$.

With such a structure, as shown by the arrows in FIG. 3, the magnetic fluxes passing through the respective magnetic yokes 10 and 10' can be concentrated to the sides of the magnetic gaps 11 and 11', thereby enabling the magnetic efficiencies to be further increased.

As described above, the magnetic thin films as shown in FIGS. 2 or 3 are used as parts of the magnetic circuits; the two magnetic yokes are adjacently and symmetrically arranged with respect to the right and left sides in a manner such that the distance between those yokes increases as they go away from the sides of the magnetic gaps; and the expanded portions having the cross sectional areas where the magnetic fluxes pass through which are larger than the cross sectional areas of the magnetic pole portions are provided. Consequently, the shapes of the magnetic yokes can be made substantially coincident with the direction in which the magnetic fluxes flow, thereby enabling the magnetic efficiencies to be remarkably raised. Also, since the distance between the magnetic yokes gradually becomes large, the crosstalk extremely decreases.

Figure 4:
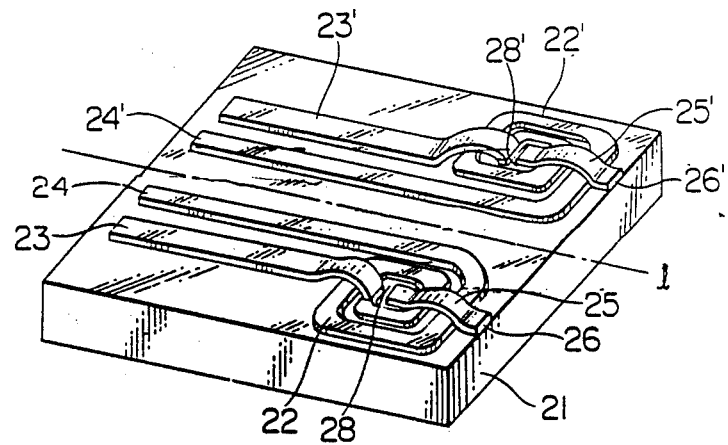
FIG. 4 is a perspective view showing thin-film magnetic heads according to still another embodiment of the invention.

FIG. 4 is a perspective view for explaining still another embodiment of the invention, in which a substrate 21 is formed of magnetic material such as ferrite or the like and constitutes a lower magnetic layer of the magnetic heads.

Coils 22 and 22' consisting of the patterns of conductive material which are wound in the opposite directions are formed on the substrate 21 at symmetrical locations with regard to the right and left sides.

Extraction electrodes 23 and 23' serving as signal lines are provided in such a manner that the respective ends thereof are connected to the starting points of windings of the coils 22 and 22' and that the electrodes get over the coils 22 and 22' through insulation layers (not shown) and extend therefrom.

Also, as will be obvious from FIG. 4, the end points of windings of the coils 22 and 22' are connected to extraction electrodes 24 and 24' which are respectively formed at the locations near the side of the axis 1 of symmetry which passes through the center between the two coils.

In addition, yokes 25 and 25' constituting the upper magnetic layers are formed at the locations which extend from contact hole portions 28 and 28' as the central portions of the respective coils to the sides of the sliding surfaces of the magnetic recording medium by getting over the coils 22 and 22'. The edge portions of the yokes 25 and 25', namely, the magnetic pole portions sandwich magnetic gap materials together with the substrate 21 and form magnetic gaps 26 and 26' on the sides of sliding surfaces of the magnetic recording medium.

In such a structure, by allowing currents to respectively flow among the extraction electrodes 23, 23' and 24, 24', the magnetic fields occur in the coils 22 and 22', causing the magnetic fluxes in the magnetic circuits including the yokes 25 and 25' and the substrate 21. The magnetic fields which project forwardly from the head gaps 26 and 26' are generated, so that it is possible to perform the magnetic recording in accordance with the signal currents respectively supplied among the extraction electrodes 23, 23' and 24, 24'.

On the other hand, in case of reading the magnetically recorded signals, the magnetic fluxes caused from the side of the magnetic recording medium flow through the gaps 26 and 26' into the magnetic circuits including the yokes 25 and 25' and the substrate 21. Thus, the voltages corresponding to the changes in amounts of magnetic fluxes are respectively developed among the extraction electrodes 23, 23' and 24, 24' which are both ends of the coils 22 and 22', thereby allowing the signals magnetically recorded to be reproduced.

In this way, the coils are symmetrically formed around the axis 1 of symmetry as a center on the substrate 21 with respect to the right and left sides. The continuous extraction electrodes are arranged symmetrically with respect to the right and left sides from the starting points of windings of the coils and from the end points of windings thereof. Due to this, the coils and electrode patterns are distributed at the same rates and this makes it possible to balance the characteristics between the two heads.

Therefore, there is no need to compensate the variation between the heads and perform the adjustment process, thereby enabling the crosstalk to be remarkably reduced.

Figure 5:
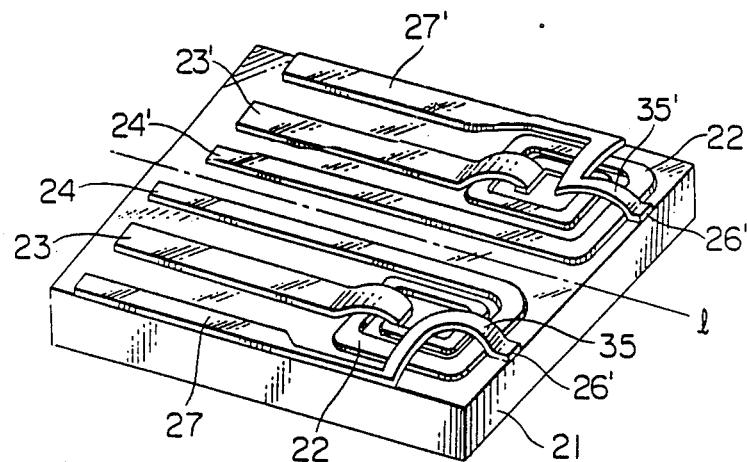
FIG. 5 is a perspective view showing thin-film magnetic heads according to further another embodiment of the invention.

FIG. 5 is a perspective view for explaining further another embodiment of the invention. This embodiment adopts the structure such that additional extraction electrodes 27 and 27' are provided in addition to the extraction electrodes 23, 23', 24, and 24' shown in FIG. 4.

These extraction electrodes 27 and 27' serve as the common earth lines and the respective ends are connected to yokes 35 and 35' of the respective heads, while the other ends are extracted in parallel with the extraction electrodes 23, 23', 24, and 24'.

With such a structure, the extraction electrodes 23, 23', 24, and 24' are shielded by the extraction electrodes 27 and 27' as the common earth lines arranged outside, so that an excellent shielding effect for external noises is obtained and the crosstalk can be further reduced.

In addition, by transmitting and receiving the signals through the extraction electrodes 23 and 23' sandwiched by the extraction electrodes 27 and 27' as the common earth lines and the extraction electrodes 24 and 24', the crosstalk at a high-frequency band is reduced and the two-channel thin-film magnetic heads which are hardly influenced by the external noises can be derived.

In the foregoing embodiments shown in FIGS. 4 and 5, examples using the magnetic substrates as the substrate 21 have been illustrated. However, it is also possible to adopt the structure such that a non-magnetic substrate is used as the substrate 21 and the lower magnetic layer is individually formed by a magnetic thin film on the non-magnetic substrate.

According to the embodiments shown in FIGS. 4 and 5, it will be obviously understood from the above description that since they adopt the structures such that the coils and extraction electrodes are formed on the substrate symmetrically with respect to the right and left sides and that the extraction electrodes connected to the end points of windings of the coils are arranged at the locations near the side of the axis of symmetry, the distributions of the coils and electrodes on the right and left sides are equal and the good high-frequency balance between the two heads is obtained, thereby enabling the crosstalk to be remarkably reduced, so that it is possible to obtain an excellent effect such that there is no need to perform the adjusting process to compensate the variation between the right and left heads.

Figure 6:
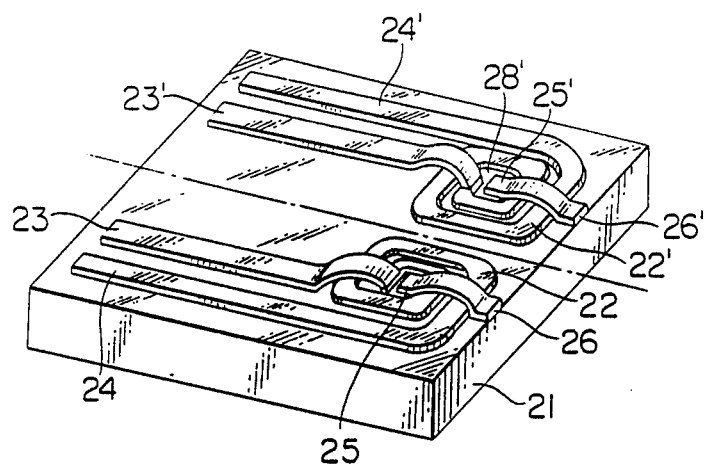
FIG. 6 is a perspective view showing thin-film magnetic heads according to still another embodiment of the invention.

FIG. 6 is a perspective view showing thin-film magnetic heads according to still another embodiment of the invention, in which the same and similar parts and components as those shown in FIG. 4 are designated by the same reference numerals.

In the diagram, the substrate 21 is made of magnetic material such as ferrite or the like since it also serves as the lower magnetic layer as parts of the heads in this embodiment.

The coils 22 and 22' are adjacently formed on the substrate 21. However, as is obvious from the drawing, the end points of windings of the coils 22 and 22' are respectively extracted from the outermost peripheries of the clockwise and counterclockwise windings and become the wire terminals (extraction electrodes) 24 and 24' which are used as the sides of the common earth lines.

The upper magnetic layers 25 and 25' consisting of permalloy or the like are led to the sides of the sliding surfaces of the recording medium of the substrate 21 from the contact holes 28 and 28' as the central portions of the respective coils in the manner such that the layers 25 and 25' get over the coils 22 and 22' through the insulation layers. The upper magnetic layers 25 and 25' sandwich the head gap material together with the substrate 21, thereby forming the head gaps 26 and 26'.

Also, the signal lines (extraction electrodes) 23 and 23' are arranged inside the right and left wire terminals 24 and 24' such that they are symmetrically located with regard to the axis l of symmetry.

The signal lines 23 and 23' are parallel to the wire terminals 24 and 24' and the respective ends are connected to the contact holes 28 and 28' at the centers of the coils 22 and 22' through the insulation layers.

With such an arrangement, by allowing the currents to flow among the signal lines 23, 23' and the wire terminals 24, 24' as the earth lines, the magnetic fields occur due to the coils 22 and 22' and the magnetic fluxes flow through the magnetic circuits consisting of the upper magnetic layers 25 and 25' and the substrate 21. Thus, the magnetic fields protrude forwardly from the head gaps 26 and 26' and the recording is performed on the magnetic recording medium by these magnetic fields.

On the contrary, upon reproduction, the magnetic fluxes flowing into the head gaps 26 and 26' from the recording medium flow through the magnetic circuits consisting of the substrate 21 and the upper magnetic layers 25 and 25', so that the voltages corresponding to the changes in amounts of magnetic fluxes are developed among the signal lines 23, 23' and the wire terminals 24, 24' as both ends of the coils 22 and 22'. In this way, the signals magnetically recorded are reproduced.

As described above, since the adjacent coils and signal lines and the like are arranged symmetrically with respect to the right and left sides, the mutual distributed capacities become equal, thereby enabling the characteristics between the two heads to be balanced.

In addition, since the distance between the signal lines 23 and 23' is wider than the distance between the respective wire terminals 24 and 24', the crosstalk between the heads is reduced, causing a shielding effect since the external noises are shut off due to the existance of the wire terminals 24 and 24'.

Figure 7:
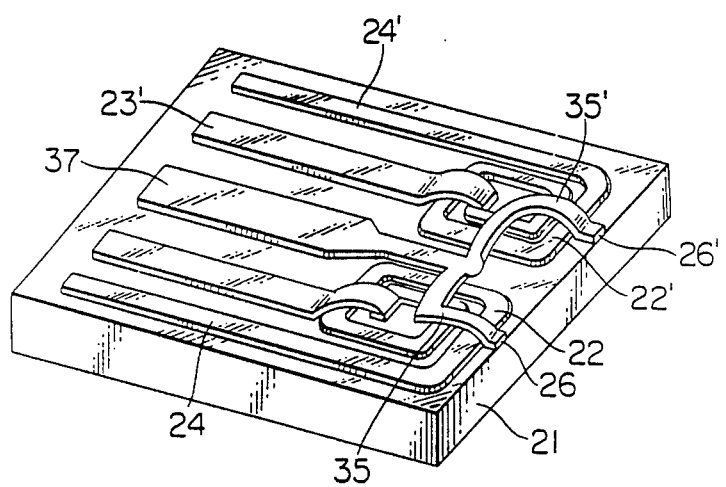
FIG. 7 is a perspective view showing thin-film magnetic heads according to still another embodiment of the invention.

FIG. 7 is a diagram for explaining further another embodiment of the invention, in which the same and corresponding parts and components as those shown in FIG. 6 are designated by the same reference numerals and their descriptions are omitted.

This embodiment adopts the structure such that a common earth line 37 is individually provided at the center of the right and left head portions and it is connected to the upper magnetic layers 35 and 35'.

With such a structure, since the signal lines 23 and 23' are respectively shielded by the common earth line 37, the crosstalk is further reduced as compared with the embodiment shown in FIG. 6.

In the two embodiments shown in FIGS. 6 and 7, examples whereby the substrate 21 constitutes the lower magnetic layer have been illustrated. However, the above-described structure can be also similarly applied to the magnetic heads of the types whereby the substrate 21 is made of non-magnetic material and the lower magnetic layer is individually formed thereon.

As is obvious from the above description, according to the embodiments shown in FIGS. 6 and 7, since they adopt the structures whereby the coils formed on the substrate are line-symmetrically arranged and the wire terminals led out from the respective coils are arranged outside and signal lines are arranged inside the respective wire terminals, the distributed capacities of the two head sections become equal and good high-frequency balance is obtained, so that the crosstalk is extremely reduced.

On the other hand, by forming the common earth line between the right and left signal lines, the respective signal lines are shielded by the common earth lines, thereby enabling the crosstalk to be further reduced.

In addition, since the extraction lines from the coils are located at the outermost positions, this also presents a shielding effect of reduction of the external noises, so that the stable operations of the magnetic heads can be performed.

What we claim is:

1. A thin film magnetic head for simultaneously tracing two tracks, comprising:
    a substrate; and
    a pair of yokes each being disposed on said substrate and formed by a magnetic thin film, each yoke having a magnetic pole portion and an expanded portion thereof,
    wherein each magnetic pole portion is spaced from said substrate to form a magnetic gap disposed between said substrate and each magnetic pole portion, and
    wherein the cross sectional area of each expanded portion taken through a plane perpendicular to the top surface of said expanded portion is larger than the cross sectional area of said magnetic pole portion taken through a plane perpendicular to the top surface of said magnetic pole portion, and wherein the distance between said pair of expanded portions increases as the distance from said magnetic pole portions increases.

2. A thin film magnetic head according to claim 1, wherein said pair of yokes are symmetrical with respect to a line.

3. A thin film magnetic head according to claim 2, wherein the lateral edge of each magnetic pole portion is rectilinear.

4. A thin film magnetic head according to claim 3, wherein the lateral edge of each expanded portion has an arc-like shape.

* * * * *

UNITED STATES PATENT AND TRADEMARK OFFICE
CERTIFICATE OF CORRECTION

PATENT NO. : 4,942,489

DATED : July 17, 1990

INVENTOR(S) : Ko Yoneda, et al.

It is certified that error appears in the above-identified patent and that said Letters Patent is hereby corrected as shown below:

COLUMN 1:

Line 5, "April 13, 1984," should read --April 13, 1987,--.

Line 56, "conven-" should be deleted.

Line 57, "tional" should be deleted.

COLUMN 3:

Line 61, "magnetic layers 10 and 10'" should read --magnetic yokes 10 and 10'--.

Signed and Sealed this

Fifth Day of May, 1992

Attest:

DOUGLAS B. COMER

Attesting Officer    Acting Commissioner of Patents and Trademarks